Aug. 31, 1954     W. E. N. DOTY ET AL     2,688,124
METHOD OF AND APPARATUS FOR DETERMINING
TRAVEL TIME OF SIGNALS
Filed Feb. 27, 1953     5 Sheets-Sheet 1

INVENTORS
WILLIAM E.N. DOTY &
BY    JOHN M. CRAWFORD

Oberlin & Limbach
ATTORNEYS

INVENTORS
WILLIAM E. N. DOTY &
BY JOHN M. CRAWFORD

ATTORNEYS

INVENTORS
WILLIAM E. N. DOTY &
BY JOHN M. CRAWFORD
Oberlin & Limbach
ATTORNEYS

INVENTORS
WILLIAM E. N. DOTY &
BY  JOHN M. CRAWFORD

Oberlin & Limbach
ATTORNEYS

Aug. 31, 1954  W. E. N. DOTY ET AL  2,688,124
METHOD OF AND APPARATUS FOR DETERMINING
TRAVEL TIME OF SIGNALS
Filed Feb. 27, 1953  5 Sheets—Sheet 5

INVENTORS.
WILLIAM E.N. DOTY &
BY JOHN M. CRAWFORD

Oberlin & Limbach
ATTORNEYS

Patented Aug. 31, 1954

2,688,124

UNITED STATES PATENT OFFICE 2,688,124

METHOD OF AND APPARATUS FOR DETERMINING TRAVEL TIME OF SIGNALS

William E. N. Doty and John M. Crawford, Ponca City, Okla., assignors to Continental Oil Company, Ponca City, Okla., a corporation of Delaware Application February 27, 1953, Serial No. 339,374

10 Claims. (Cl. 340—15)

This invention relates to the problem of determining the travel time of signals. This problem is encountered in many fields and in many environments and when solved in a practical manner can lead to results which have heretofore been unattainable.

The present invention is particularly applicable for the determination of the travel times of the several components into which a single emitted signal may divide and which components respectively progress through different channels. The present invention will be found to be of particular utility in the field of seismic exploration. Since this field is one in which the invention will have great utility, it will be described as applied specifically to that field.

It is the principal object of this invention to provide a method and apparatus of the character described which can be carried out not only with a minimum of relatively simple equipment but also with a minimum of human effort whereby errors due to equipment failure and errors due to human judgment and carelessness are reduced to a minimum.

It is a further object of this invention to provide a method and apparatus which is operative under such conditions and in such manner that the data, upon which ultimate conclusions are based, are determined in a relatively leisurely fashion as compared, for example, with the essentially short intervals of time during which are collected the data when employing seismic prospecting methods wherein seismic waves are generated by means of explosions.

It is a further object of this invention to provide a method and apparatus whereby energy transmitted by a continuous or semi-continuous process over a period of minutes can be detected and analyzed more effectively than the energy generated during a few microseconds such as by an explosion, even though the instantaneous energy of the explosion may be many times greater in magnitude than the instantaneous energy of the continuous or semi-continuous process.

It is a further object of this invention to provide a method and apparatus whereby it is not necessary to have the frequency or rate of change thereof closely controlled, the only requirement being that it be unique (i. e., non-repetitive) over a period of time longer than the greatest time delay to be measured. With this method and apparatus successive signal groups need not be alike, thus eliminating need for complicated frequency control apparatus and allowing the use of very simple and efficient transducers or transmitters of energy.

It is a further object of the present invention to provide a method and apparatus whereby the character of the signal can be carefully controlled and thus errors relatable directly and indirectly to the initially generated signal are reduced to a minimum.

Other and more particular objects of the invention will appear as the description proceeds.

As previously indicated, throughout the following description this invention will be explained by having particular reference to its application to seismic exploration.

The following description and the annexed drawings are therefore merely illustrative of the invention, and its utility in other fields will be apparent.

In said annexed drawings.

Fig. 10-A is a diagrammatic illustration of the type of record made during the application of the present method to the structure shown in Fig. 10.

Broadly stated, the present invention comprises a method of determining the travel time, between spaced first and second points, of a unique signal which is non-repetitive during a period which is at least as long as such travel time, comprising (a) Transmitting such a signal from said first point, (b) Providing a counterpart of said transmitted signal, (c) Multiplying
   (i) at least a substantial portion of the total transmitted vibration energy which is received at said second point, by
   (ii) said counterpart signal, (d) Integrating for a substantial period the product of said multiplication, and altering the phase relation between said counterpart signal and said transmitted signal during successive integrating periods, and (e) Recording the values derived from such integration; whereby the out-of-time-phase relation of said counterpart signal with respect to the transmitted signal at said first point, which yields the greatest value from such integration, may be used as a parameter of the travel time of said unique signal between said points.

A complex unique time series multiplied by itself with zero time phase and integrated over an extended interval of time will have a value depending upon its average amplitude and the time interval of integration. However, if this time series is shifted relative to itself a small increment of time ($\tau$) and the multiplying and integrating process repeated the value will be appreciably less. As the time increment of shift is increased to be approximately equal to the average period of the signal, the integrated value will approach zero.

The complex unique signal multiplied by any other independent signal and integrated over an extended time interval will have a value of approximately zero. This latter process can be identified as cross-correlation.

It will be recognize that these above discussed characteristics of auto-correlation of and correlation in conjunction with a unique signal provides a means of detecting and determining the time-phase relationship of a known signal mixed with other signals. Furthermore, if the unique signal is added to several components thereof, which have respectively progressed through a multiplicity of different travel time paths, to form a complex composite signal, the presence of each path and its travel time can be established by this technique. These features are basic in the method of this invention.

Figure 1:
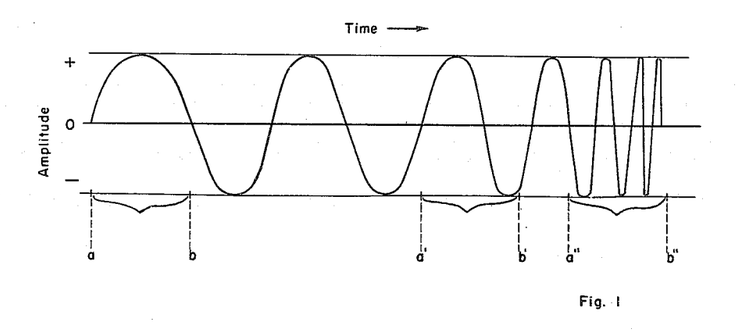
Fig. 1 is a diagrammatic representation of a unique or non-repetitive signal such as is used in carrying out this invention.

Consider a signal or a wave representing amplitude of motion about a zero position over a period of time as shown by Fig. 1. It will be noted that the signal represented in Fig. 1 is unique, that is, it is not identical to itself at any later time. The signal, of course, has instantaneous amplitudes of equal value over and over but the trace of the signal for any reasonably long interval cannot be made to overlay perfectly the trace of the portion of the signal during any other portion of the interval during which the signal is non-repetitive. For instance, the interval ($ab$) does not overlay on interval ($a'b'$) or ($a''b''$) etc.

Figure 2:
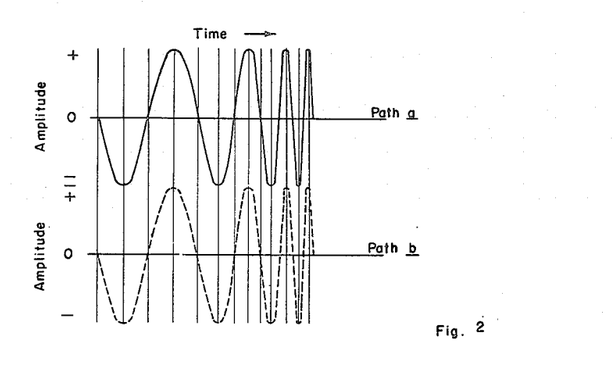
Fig. 2 is a diagrammatic representation of two identical in-phase signals, each of which is generally similar to that illustrated in Fig. 1. These two signals might conceivably be separate components of an initial signal like that shown in Fig. 1 but propagated through several channels or paths each of which has the same effect on the signal.

Now consider the above signal divided into two components which respectively progress through different paths such that, in effect, two identical signals are formed but one path phase-shifts its signal various amounts relative to the signal in the other path. If this is done and the signal coming from the two paths is multiplied and the products summed or integrated over an extended interval of time, the following characteristics will be observed:

When the shift is zero as illustrated in Fig. 2, the product of every instantaneous value is a plus number, that is because, $$+a \times +b = +ab$$
$$-a \times -b = +ab$$

Consequently, the sum of these products over a long period of time will be a large plus number. The exact value of the sum will be dependent upon the average amplitude of the signal and the time interval over which the multiplication and summing or integration is done.

Figure 3:
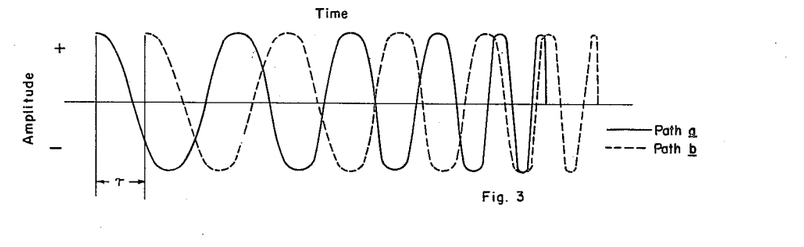
Fig. 3 is a composite diagram of separate identical signals or separate components of a single initial signal, but wherein there is a phase shift between such signals or components.
Figure 4:
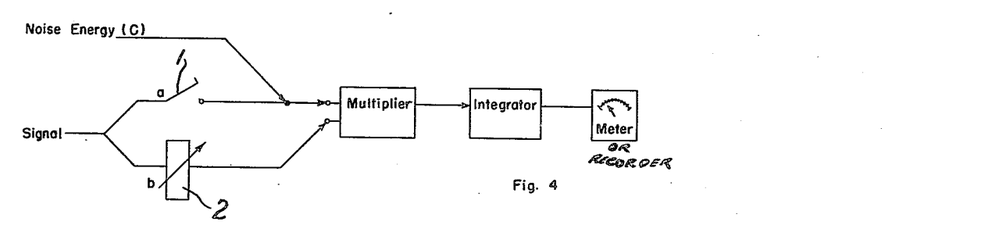
Fig. 4 is a diagrammatic representation of the equipment used in carrying out this invention and an illustration, also diagrammatic, of the variables which are encountered and determined by the use of this process.

If the two signals are shifted out-of-phase by an amount illustrated in Fig. 3, the product of instantaneous values in time are not all positive, on the contrary, approximately one-half of the products will be $$+a \times +b = +ab \text{ and } -a \times -b = +ab$$

and the other half will be $$-a \times +b = -ab \text{ and } +a \times -b = -ab$$

so that the algebraic sum of the products over the same long time interval as before will approach zero. It is thus seen that this signal from the two paths multiplied and integrated, produces a value which is a maximum when $\tau$ equals zero and becomes progressively smaller as the value of $\tau$ is increased. The various possibilities of this multiplication and summation process will begin to be recognized when, for example, three signals are considered. These signals may consist of the two signals discussed above (actually one signal through two paths and recombined at adjustable phase relationships) and a third signal which is entirely different from the first. Fig. 4 is a diagrammatic illustration of this condition. The third signal ($c$) is added into the signal $a$, then the sum $a+c$ is multiplied by $b$ and the products integrated. In the line representing path ($a$) there is shown a switch 1 by which the path may be blocked (switch open). In the line representing path $b$ there is shown included a diagrammatic representation of a means 2 by which there may be provided an adjustable time shift of up to about 3 sec. between the signals respectively propagated through a and b.

If switch 1 is open such that only unlike signals b and c are multiplied, instantaneous positive and negative values appear at the input to the integrator. It is apparent from statistics that over any substantial period of time the total of the negative values will be equal to the total of the positive values such that the sum will be substantially zero. This is somewhat equivalent to flipping a coin a great many times. The total heads and total tails will be very nearly equal.

Now if switch 1 is closed such that $(a+c)$ is multiplied by $(b)$, and $(b)$ is shifted so that the equivalent of $\tau$ in Fig. 3 is substantial, the integrated products over an extended time interval will also be zero. However, when the relative shift of $(b)$ to $(a)$ is made zero, i. e., so that $\tau$ is zero and $(b)$ will overlay with $(a)$, then the product $$b(a+c) = b \cdot a + b \cdot c$$

these products will, as discussed above, provide a sum $$\sum_0^\tau b \cdot a = +\text{value}$$

$$\sum_0^\tau b \cdot c = 0$$

Figure 5:
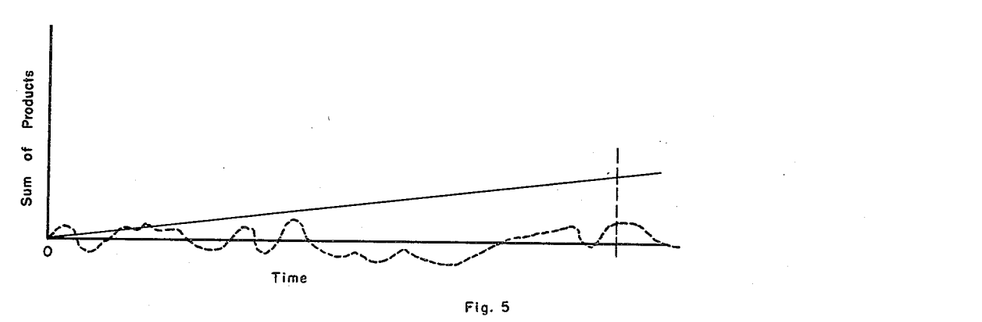
Fig. 5 is a diagrammatic representation of the manner in which two components of an initially generated, unique, non-repetitive signal such as is utilized in carrying out the present process, when substantially in-phase, will, when multiplied, integrate to a substantial positive value whereas multiplication and integration of the extraneous signals or "noise" amounts at best to no more than a considerably lower value which may be very close to zero.

Note that $(b)$ times $(a)$ has provided a sum equal to the value of $(b)$ times $(a)$ in the absence of the third signal $(c)$. If $(c)$ is considered a noise component, and $(a)$ a desired signal, it is seen that $(a)$ can be detected in the presence of the noise component $(c)$ even though $(c)$ is much larger than $(a)$. It is important to note that the power of the technique lies in summing or integrating the products over a substantial time interval, because if $(c)$ is large, its instantaneous summed or integrated products with $(b)$ will be appreciable and will oscillate in a random manner about 0. The summed product $(ab)$ may at first be small. However, it steadily increases with integration time. This effect is illustrated in Fig. 5 wherein the broken line represents sum of $b \times c$ and the solid line represents the sum of $b \times a$ (with $b$ in time phase with $(a)$).

The foregoing is a description of the basic principle underlying the method of this invention. In the description which now follows there will be given a brief description of one form of apparatus which may be employed and the manner in which it may be used in carrying out the invention. This form of apparatus is especially useful in exploration of the earth by seismic or acoustic waves.

The energy source or transducer which may be used to generate the initial unique signal which is no-repetitive for substantial periods may be of any type which can transmit a harmonic compressional wave into the earth, for instance, with a controllable frequency and substantially constant amplitude. Electromagnetic transducers may utilize an engine driven A. C. generator coupled electrically to a large electromagnet, a massive member of which is caused to vibrate in synchronism with the A. C. current from the generator. The speed of the engine controls the frequency of the generated A. C. voltage and the frequency of vibration of the transducer. Amplitude of transducer vibrations and hence the energy output is easily controlled by means of well-known methods of controlling the A. C. current output to the transducer coils.

Figure 8:
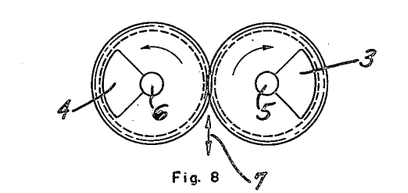
Fig. 8 is a diagrammatic representation of one form of mechanical means for creation of a unique signal such as may be used in the present invention.

Another type of energy source can be used in which an engine is directly coupled to a multiple array of off-center weights on counter-rotating shafts. One such possible arrangement is shown as Fig. 8. Since the weights, 3 and 4 carried by rotating shafts 5 and 6 respectively which are intergeared so as to rotate in synchronism, revolve in opposite directions and at the same rate, the vibrational force will act only along the line at right angles to the shafts determined by the two positions at which the centers of gravity of the weights line up with each other. Thus, in Fig. 8, the weights line up in such a manner that vibration of the whole system would be along a single direction as shown by the arrow 7.

It is very easy to generate a signal which is unique (non-repetitive) during a period of, say, 4 seconds with any of the energy transducers described above. One simple way which is especially useful in seismic exploration art is to start with a frequency of vibration such as 20 cycles per second and to steadily increase the frequency of vibration to perhaps 80 cycles per second during an elapsed time of 4 seconds. The frequency can then be allowed to decrease to approximately 20 cycles during the next 4 seconds and then the whole process repeated as many times as necessary. In using the engine-driven vibrator (with the off-center weights), the operator may start with the engine running at a speed which causes the vibrator to generate 20 cycle energy and may then accelerate the driving engine speed so that the vibrator is running at 80 revolutions or vibrations per second at the end of 4 seconds. A brake may then be applied and the entire apparatus slowed to 20 revolutions per second during the next 4 seconds. The absolute rate of acceleration and deceleration is not critical nor does it need to be duplicated exactly during successive runs. The only requirement being that the transition occur in no less than 4 seconds and that it follow the general scheme outlined.

The same technique applies to an engine driven A. C. generator which in turn drives an electromagnetic transducer or vibrator. Means for similarly varying the frequency of electronically generated A. C. voltages are well known.

Further variations of the apparatus for signal source may include electronic means for generating, controlling and amplifying the A. C. power necessary to cause the electromagnetic transducer to vibrate in the desired manner.

If a very high energy level of vibration is to be maintained, it will be necessary to bond the transducer to the surface of the earth by suitable means. For readily movable installations, this may be accomplished by clamping a plurality of long stakes to the transducer base after they have been firmly driven to a suitable depth. Additional degrees of coupling to the earth may be obtained by boring holes into the subsoil or bedrock and constructing a sort of pier structure whose points of support are located at a substantial depth.

If it is desired that the vibrational energy be propagated vertically downward, improved coupling may be obtained by using a plurality of transducers, preferably electromagnetic, arranged in a laterally spaced pattern to allow uniform distribution and the spacing so chosen that the energy leaving the transducers vertically downward will be substantially in phase while energy travelling laterally along the surface of the earth will interfere and substantially cancel. These concepts are familiar to those skilled in seismograph prospecting art.

Detecting means for receiving earth or transducers vibrations may be conventional seismometers, preferably of the type which have nearly constant response to all vibrations except that the detector $D_1$ (Fig. 9) which is either fixed to or very near the transducer T is so constructed as to withstand high amplitude vibrations and to yield an electrical signal comparable to that obtained from the remote detector $D_2$. This means that $D_2$ is much more sensitive than $D_1$. They may be used in any sort of multiple, series, parallel or series-parallel arrangement to yield desirable collective sensitivity to energy from one direction, such as vertical, and insensitivity in another direction, such as lateral. These arrangements or "nest" groupings are identical in form and intent with groupings in normal seismographic exploration methods utilizing explosives as the energy source.

Figure 9:
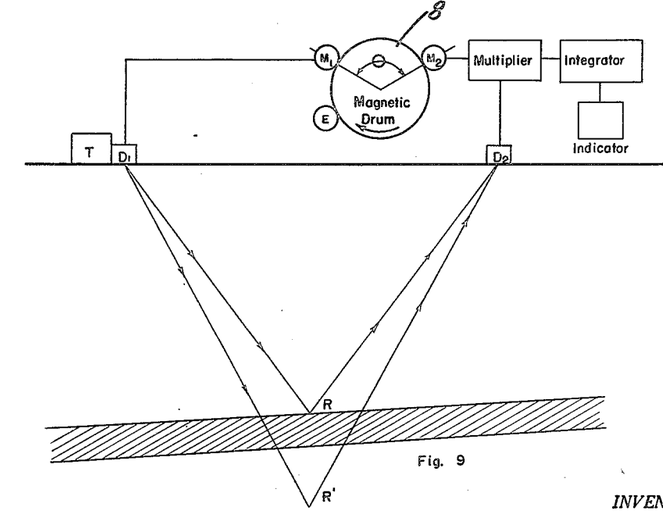
Fig. 9 is a diagrammatic representation of the application of the present invention to a simple seismic determination.

To obtain an accurately measurable and continuously variable time delay of the signal from $D_1$, a continuous magnetically coated cylinder or drum 8 is provided with means to rotate it at a very constant speed (Fig. 9). Spaced around this drum are magnetic heads as follows:

$M_1$—Recording head which places the signal on the drum as it is received from $D_1$.
$M_2$—Movable reproducing head which detects the magnetic signal placed on the drum by $M_1$.
E—Erasing head which removes the magnetic signal from the drum, leaving it ready to receive a new signal.

When the signal from $D_1$, as stored on the drum 8 and the signal from $D_2$ are to reach the multiplier substantially in phase, then the magnitude of the time delay between the signal from $D_1$ and the signal picked up by $M_2$ is a function of the travel time of the magnetic drum surface from the position of $M_1$ to the position of $M_2$. If the speed of rotation of the drum is constant, then the time delay for an angular separation of $\theta$ radians is a function of the angle $\theta$ only, or $t = k\theta$ where $k$ is a constant, determined by the speed of rotation.

This apparatus makes it possible to provide a signal identical to the output of the transducer and which signal may be replayed with any amount of time-delay introduced, the limitations being imposed only by the rate at which the drum revolves and the maximum angle which can be set between $M_1$ and $M_2$.

Thus, if the drum shown travels one complete revolution in 6 seconds and $M_2$ can be moved through an angle of 300 degrees, then a maximum time delay of 5 seconds can be introduced with this apparatus. If the drum is 10 inches in diameter, this would mean that the magnetically coated surface would move at a speed slightly in excess of 5 inches per second which is adequate for recording and reproducing signals most often encountered in seismic work, i. e., 10 to 200 cycles per second. This allows time-matching of any signal, which has traveled through the earth from T to $D_2$, with the original signal. For instance, if a signal has traveled from T to R to $D_2$ in 1.26 seconds, the replayed signal can be time-matched with the reflected signal by placing $k\theta = 1.26$. As stated before, these two matched signals can then be correlated by multiplying and integrating over a period of time even though many other signals are being received at $D_2$ simultaneously. This arrangement does not, however, discriminate between the reflected component of the original signal and another component of the same signal arriving via a different path if the travel time happens to be equal to the reflection time (1.26 seconds in this case). This is not particularly objectional, especially in seismic exploration since such second signal does not erase the reflected signal and hence the system, under such circumstances will still show the presence of a reflecting bed.

If the signal generated by T is unique during a period of four seconds, i. e., it does not repeat itself during this time, then any signal matched and detected at a time delay between 0 and 4 seconds is unique and represents the minimum travel time. If the signal were periodic or repeated itself identically every 0.2 second, then a correlation would repeat itself every 0.2 second of time delay.

Obviously, the speed of the drum surface and the maximum angle of displacement $\theta$ must be chosen to allow time delays equal to the greatest reflection or other travel time to be measured. In ordinary reflection seismic work, this time will generally be less than four seconds.

Although we have shown only one set of magnetic heads, it should be understood that any number of sets of recording, reproducing, and erasing heads may be placed along a cylindrical drum and each set then used with a different detector similar to $D_2$ and occupying different locations. Also, more than one reproducing magnetic head may be used in connection with a single recording head to simultaneously match the arrival of additional signals at $D_2$ from other reflectors such as $R'$.

Signals from $M_2$ and $D_2$ are fed into the multiplier and integrator circuits which act in accordance with the theory outlined above. When a reflected, refracted, or directly transmitted signal arrives at $D_2$ at the same time the delayed magnetic signal reaches $M_2$, the indicating mechanism (indicator or meter) will show a reading which is higher than for mismatched signals. There will be as many positions of $M_2$ giving a signal maximum reading or peak as there are separate, discrete time paths for energy traveling from the transducer and the relative height and sharpness of the various peaks will depend on the time of integration and the relative amounts of unwanted vibrations which do not match the $M_2$ signal.

Automatic mechanisms can be used to cause $M_2$ to scan the entire time range, plotting the response of the integrating mechanism as a function of time delay. Thus, means may be provided for automatically varying the value of the angle $\theta$ by uniform and predetermined amounts and the magnetic drum caused to rotate for a predetermined length of time at each such setting for the angle $\theta$. The length of time during which the drum will rotate at each such angle setting will be the time necessary for the integrator to show a definite peak or positive value on the indicator which time will of course be greater than the duration of the interval during which the unique signal is non-repetitive. A recording device may be associated with such automatic means for changing the value of the angle $\theta$, which recording device would automatically make a record at the end of each such time interval of the value shown on the indicator.

Figure 10:
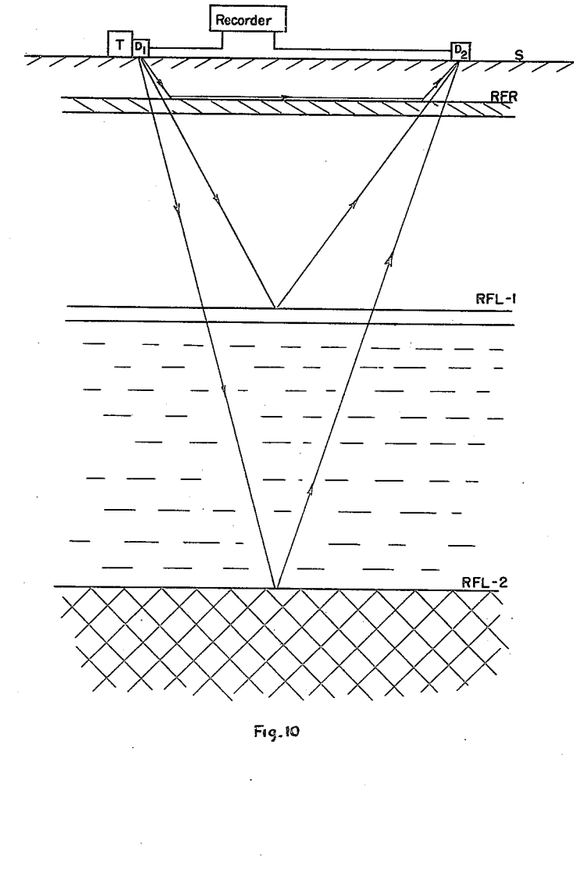
Fig. 10 is a diagrammatic representation, similar to Fig. 9, showing, however, application of the present method to a more complicated geological structure.

The apparatus described thus far, provides means for detecting energy arriving at $D_2$ and accurately measuring the travel time from T to $D_2$. In Fig. 10, we have shown the same physical setup of transducer, detectors, and recorder (which includes multiplier, integrator, and indicator)

and in Fig. 10-A, a plot of the amplitude shown by the indicator when each small time delay interval such as 0.01 second is integrated for a constant time and this amplitude plotted against total delay time (also travel time).

The response peaks shown are at times as follows:

$T_S$, time for signal to travel along surface to $D_2$
$T_{RFR}$, time for signal to travel along shallow refractor RFR
$T_{RFL1}$, time for signal to travel vertically to reflector RFL1 and back to $D_2$
$T_{RFL2}$, time for signal to travel vertically to reflector RFL2 and back to $D_2$ In this manner, the surface travel, refraction, and various discrete reflection times can be measured at a plurality of points and a map of these values secured. If the velocity of sound travel is known in the various strata, well known formulae may be used to compute the depth of each refractor or reflector point.

Figure 11:
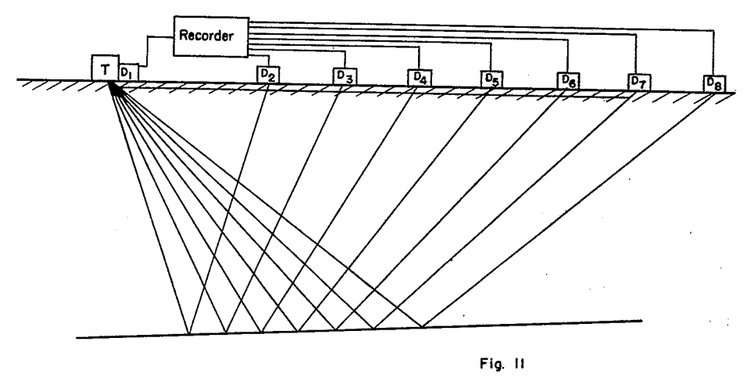
Fig. 11 is a diagrammatic representation of the application of the present method when utilizing a plurality of receivers whereby a record such as illustrated in Fig. 12 may be produced.

In Fig. 11, a setup is shown in which additional exploring detectors are used and each one connected to separate magnetic traces (obtained from a plurality of magnetic recording heads electrically connected to $D_1$ and in parallel with each other).

Figure 12:
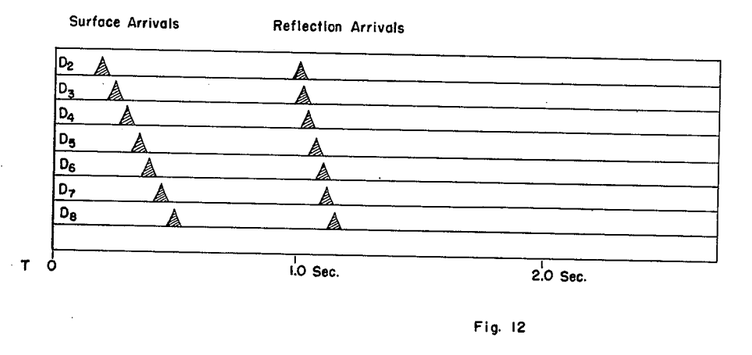

Fig. 12 shows one method of presenting the data recorded with such an arrangement used to measure surface travel times and reflection times for a single reflector. The same information can be secured by placing $D_2$ successively at each of the indicated detector positions and recording the corresponding data at separate times rather than simultaneously.

The criteria for distinguishing between refracted, reflected, and other signals are identical to those in general use in conventional seismic prospecting using explosives. These criteria include relative time variations with progressively shifting surface locations of detector and/or vibration source, continuity, or consistency of signal originally identified as a reflection, interrelation between reflection data from different levels, etc.

In Fig. 12, the surface arrivals will be recognized by correlating the delay or arrival times with the surface wave velocity and measured distance from T to $D_2$, $D_3$, $D_4$, etc. Similarly, the reflection arrivals shown will be identified as such by the fact that all occur in a consistent pattern and nearly at the same time, the variation or "step-out" being normal considering the difference in path length for the energy from T to successive detectors. On an actual record there would be other peaks indicating other arrivals, but those not showing systematic and characteristic line up across the plot would be disregarded.

The reality of a particular reflection can be further proven or disproven by noting whether it is present at successive setups of detectors and transducer spaced at various lateral distances along the surface.

As previously indicated in carrying out the present method the unique signal, which is non-repetitive during any substantial length of time, as sent out, or prototype of that signal is stored or recorded, as for example, on a magnetic drum. A portion of the original signal is propagated, for example, through the earth and the principal object of the present invention is to measure the time lapse between the emanation of the original signal and its arrival at a remote point by a detector at such remote point. The signal as received by the detector is fed to the multiplier together with the prototype or record of the original emanated signal as recorded on the magnetic drum. As explained above the maximum value derived by integrating the product of the received and recorded prototype signal will be secured when the prototype is made to exactly overlay the received signal, i. e., without phase shift between the prototype and received signal, that is when $\tau$ is zero. Thus, the time which the recorded or prototyped signal must be delayed before being fed to the multiplier in order to secure a maximum value on the integrator is a direct indication of the time required for the emanated signal to reach the remote detector.

In order to increase the criticality of the apparatus various expedients may be resorted to when employing the basic system as explained thus far. One of these expedients is the inclusion, in the path to the multiplier which extends from the transducer or $D_1$ through the recording drum on which is stored a prototype of the emanated signal, of means which have a modifying effect on the signal generally equivalent to the modifying effect on the transmitted signal of the medium which comprises the path through which such signal is forced to travel in arriving at the detector $D_2$. It is to be expected that the earth will modify a signal traveling through it such that the signal picked up at the detector $D_2$ will be different than that recorded on the magnetic drum. The earth's effect upon phase and amplitude of the various components of the signal will be a function of the particular path traversed and will be different for different paths. Obviously this will prevent an absolute overlay of the signal through the earth with the signal recorded and reproduced from the magnetic drum. Only one band of frequencies overlay for a given delay. This absolute overlay is necessary if a sharp correlation peak is to be obtained. The serious effect of amplitude and phase distortion along an earth path will be to broaden the correlation peak such that the accuracy of the travel time determination may, in certain instances, be seriously reduced. This correlation peak obtained is actually a cross correlation of the output of a system (the earth) against its input. It is theoretically possible to take the cross correlation function or curve and operate on it mathematically (Fourier transform) to obtain the amplitude and phase characteristics of the earth for the respective path. This mathematical process is very tedious at best.

Figure 7:
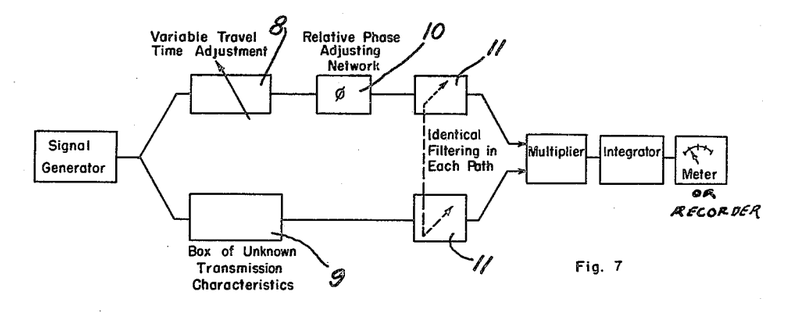
Fig. 7 is a diagrammatic representation, generally similar to Fig. 4, showing, however, a more elaborate and complete arrangement of apparatus which is illustrative, not only of the equipment required, but also of the manner in which the invention may be carried out.

In accordance with the present invention there is introduced into the magnetic drum path, an adjustable amplitude and phase distorting device generally indicated at 3 in Fig. 7 which provides the means of making the signal along the drum path absolutely overlay the signal arriving at the receptor along a path through the earth. That is, we will introduce an earth simulator. The adjustable amplitude and phase circuit will have a discrete setting for each path. The magnetic drum by which the variable travel time adjustments may be inserted in one of the paths is indicated at 4 in Fig. 7 and the box of unknown transmission characteristics, generally indicated at 9, is made to represent the earth. One reason for the necessity for the relative phase shifting network 10 is that whereas the magnetic drum might store the prototype of the emanated signal for any variable length of time this storage time is the same for all frequencies whereas the same signal when traveling through the earth channel on its way to the receptor is not slowed down in the same uniform manner, that is, certain frequencies will have a propagation time greater than others and for the purpose of simulating different earth effects the relative phase shifting network is employed. This process not only sharpens the correlation peak and thus the accuracy, but it also establishes the amplitude and phase characteristics of the various paths through the earth. The phase and amplitude data will be independent of the absolute time measurement being made.

One improvement in the simple basic system for the purpose of increasing the sharpness of the data determined by the process is the utilization of sweep frequency filtering. This improvement can be incorporated only if a sweep frequency signal of some type is being employed.

The sweep filter indicated at 11 in Fig. 7 must be inserted in both paths. This prevents the filter phase characteristic from affecting the travel time determination, because it affects the signal in both paths the same. The time delay of the reproducer head will be the same with or without the filtering. Of course the signal coming from the magnetic drum does not usually require filtering for signal to noise considerations.

The signal from the receptor consists of a composite of the sweep frequency signal combined at different time arrivals, also more or less random noise arrivals. The composite signal broken down into its components shows that considerable gain in relative amplitude can be achieved for a given path by applying a filter which maintains its center frequency at the exact frequency instantaneously arriving via that particular path.

Figure 6:
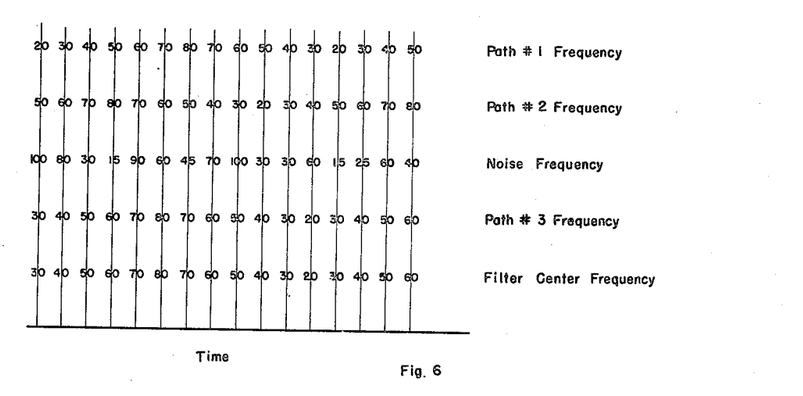
Fig. 6 is an illustration of the manner in which sweep frequency filtering may be utilized to great advantage in carrying out this invention.

For the purpose of illustrating graphically the manner in which sweep frequency filtering may be used to advantage in the case where there are three paths for the signal and one random noise arrival, reference may be had to Fig. 6. From the data there given it will be noted that the signal through path No. 3 is passed to the multiplier whereas the signals from the other paths and the noise are attenuated.

The term "unique non-repetitive signal," as used in the specification and claims, is intended to mean a signal of predetermined duration, whose shape does not repeat itself within its duration interval. That is to say, and assuming that the signal comprises several cycles, that the frequency or other essential characteristic varies with time in such a manner as no substantial region of a trace of the signal is repeated during the pre-determined length of the signal. Of course, it is to be understood that a succession of similar non-repetitive signals may be actually produced by the signal source, and the signals may follow one another immediately, or there may be intervals therebetween in which no signal is transmitted. Thus, the succession of signals may be thought of as individual "bursts" such as each burst comprises one or more cycles of vibrating energy so distributed that no portion of the signal is repeated within any one burst.

While for purposes of illustration, there has been shown a particular signal comprising several sinusoidal cycles of decreasing wave length, it is to be understood that other non-repetitive waves may be used, the effect of wave length may be caused to increase from the beginning to the end of a particular signal burst, and the general shape of the individual cycles may be other than sinusoidal. Moreover, such a non-repetitive signal, for example, may be constituted by a carrier or wave of fixed frequency upon which is superimposed a non-repetitive modulation, so that successive carrier signals are distinct from one another by characteristic imposed thereon by the modulating frequency, which in itself may take any convenient non-repetitive shape.

The essence of the requirement for unique and non-repetitive signals is that when such a signal is superimposed upon its counterpart in various phase relationships thereto, at only one value of the phase relationship will exact correspondence be obtained.

It is also to be understood that while an important field of application for the invention lies in determination of distance of a particular stratum below the surface of the earth, in which case the signal energy constitutes an elastic wave through the earth, which is received and compared with a counterpart signal of a purely electrical nature, the system itself is not limited to such an application. Thus, what may be called the "exploring path" and the "phase comparison path" may either or both be electrical energy transfer paths, and may be constituted by physical conductors, space radiation, or equivalent transmission channels. Also it is possible to utilize elastic propagation for both the exploring path and the comparison path, and the exploring path itself is not in such a case restricted to earth but may be constituted by a body of water in which exploration is desired, or the interiors of other solid, liquid or gaseous bodies.

The apparatus illustrated in the drawings and described in detail above can be altered in numerous ways that will be in part obvious to those operating under the invention. Thus, in the apparatus shown in the drawings, a magnetic recorder type of storage device has been shown for introducing an adjustable time-phase shift in the path of the counterpart signal. Obviously, equivalent phase shifting arrangements can be employed, such as electrical delay lines or the like, and other short-period storage devices. Also, the variable phase shift or time delay need not necessarily be in the path which carries the counterpart wave; if a sufficiently large fixed delay is introduced in that path, then an adjustable delay device in the main or exploring path will permit the same relative phase adjustment between the signals. In this case, the delay introduced by the fixed delay device must be at least as long as the maximum travel time which is being determined.

It is also feasible to make a more or less permanent recording of signals received over the exploring path and the comparison path as individual signals, which can later be reproduced (as in a rather relatively remote laboratory or the like), the requirement in this case being that the phase positions in the two recorded signals be accurately known and controllable so that they can be reproduced, multiplied and integrated to provide the desired indication of travel time in terms of maximum combined ouput. Such more or less permanent recordings could be in the form of magnetic records, photographic traces, or any equivalent storage arrangement.

With an arrangement of the type indicated in Fig. 9 of the drawings, the separation between the magnetic recorder or reproducer heads $M_1$ and $M_2$ may become inconveniently small where short travel times are being measured. In this case, the $\theta$ angle may be raised to a convenient value by introducing a suitable fixed delay in the exploration channel. This can be accomplished, again, by an electrical delay network, a separate magnetic storage device or the like, or by an individual record track on the magnetic drum, associated with its own pair of recorder, reproducer, and erasing heads.

When the exploring path lies in a material which exhibits different propagation velocities for different frequencies of signal energy, phase distortion of the signal as received over that path will result from the effective changes of frequency utilized to obtain a non-repetitive signal. Since, in such cases, this would alter the similarity between the signals received over the two paths, it is desirable to correct for this phase distortion. Such a correction may be carried out either by artificially introducing into the signal received over the distorted path, a compensating network or the like having the inverse phase distortion effect or by placing in the comparison path a network or the like having a similar distorting characteristic.

It is desirable for the two signals, prior to multiplication, to have approximately equal energy levels, which can readily be achieved by providing an attenuator in that path having the highest efficiency of energy transfer or by an equalizing amplifier in at least one of the paths.

Other modes of applying the principle of the invention may be employed, change being made as regards the details described, provided the features stated in any of the following claims or the equivalent of such be employed.

We, therefore, particularly point out and distinctly claim as our invention:

1. A method of determining the travel time, between spaced first and second points, of a unique signal having vibration energy which is non-repetitive during a period which is at least as long as such travel time, comprising
   (a) Transmitting such a signal from said first point,
   (b) Providing a counterpart of said transmitted signal,
   (c) Multiplying
      (i) at least a substantial portion of the total transmitted vibration energy of said signal which is received at said second point, by
      (ii) said counterpart signal,
   (d) Integrating for a substantial period the product of said multiplication, and altering the phase relation between said counterpart signal and said transmitted signal during successive integrating periods, and
   (e) Recording the values derived from such integration; whereby the out-of-time-phase relation of said counterpart signal with respect to the transmitted signal at said first point, which yields the greatest value from such integration, may be used as a parameter of the travel time of said unique signal between said points.

2. A method in accordance with claim 1 characterized further in that said transmitted signal is continuous.

3. A method in accordance with claim 1 characterized further in that said transmitted signal is a series of time-spaced bursts.

4. A method in accordance with claim 1 characterized further in that said transmitted signal is an elastic wave signal.

5. A method in accordance with claim 1 characterized further in that said time periods referred to in (d) are all equal.

6. A method in accordance with claim 1 characterized further in that the counterpart signal has an energy level substantially equal to the energy level of that portion of the transmitted signal received at said second point with which it is multiplied.

7. A method in accordance with claim 1 characterized further in that the differences in phase relation between the counterpart and transmitted signals during successive periods referred to in (d) are substantially equal amounts.

8. A method in accordance with claim 1 characterized further in that the phase relation between the counterpart signal and the transmitted signal at said first point as referred to in (d) is such that said counterpart signal lags in time.

9. A method in accordance with claim 1 characterized further in that said counterpart signal is phase distorted to correspond to the phase distortion of the transmitted signal by the medium through which it is transmitted to said second point.

10. A method in accordance with claim 1 characterized further in that said first and second points are near the earth's surface and said transmitted signal is directed into the earth for reflection and refraction from sub-surface strata.

References Cited in the file of this patent

UNITED STATES PATENTS

| Number | Name | Date |
|--------|------|------|
| 2,634,398 | Piety | Apr. 7, 1953 |